United States Patent [19]

Hedblom et al.

[11] Patent Number: 4,981,556
[45] Date of Patent: Jan. 1, 1991

[54] PROCESS FOR THE PREPARATION OF SULFIDE-FREE ALKALI LIQUOR USING COPPEROXIDE

[75] Inventors: Mats-Olov Hedblom; Hakan Bergstrom, both of Avesta; Per Ulmgren, Lidingo, all of Sweden

[73] Assignee: Alby Klorat AB, Avesta, Sweden

[21] Appl. No.: 508,546

[22] Filed: Apr. 11, 1990

Related U.S. Application Data

[63] Continuation of Ser. No. 331,510, Mar. 31, 1989, abandoned, which is a continuation of Ser. No. 85,540, Aug. 13, 1987, abandoned.

[51] Int. Cl.$^5$ ............................................. D21C 11/00
[52] U.S. Cl. ..................................... 162/29; 162/30.1; 162/30.11; 423/642
[58] Field of Search ...................... 162/29, 30.1, 30.11, 162/45, 87, 88, 79; 423/184, 642, 561.1

[56] References Cited

U.S. PATENT DOCUMENTS

| | | | |
|---|---|---|---|
| 2,031,844 | 2/1936 | Moore | 423/642 |
| 2,054,727 | 9/1936 | Lundin et al. | 162/30.11 |
| 2,056,929 | 10/1936 | Moore | 423/642 |
| 2,164,141 | 6/1939 | Moore | 423/642 |
| 3,909,344 | 9/1975 | Lukes | 162/30.11 |
| 3,959,068 | 5/1976 | McIlroy et al. | 162/30.11 |
| 4,039,372 | 8/1977 | Reeve et al. | 162/30.11 |
| 4,098,639 | 7/1978 | Noreus et al. | 162/87 |
| 4,163,043 | 7/1979 | Dezael et al. | 423/642 |
| 4,409,066 | 10/1983 | Reeve et al. | 162/88 |

FOREIGN PATENT DOCUMENTS 107996 12/1965 Norway .

OTHER PUBLICATIONS

Chemical Abstract 103(12): 89843t, 1985.
Chemical Abstract 90(4): 25877n, 1978.

Primary Examiner—Karen M. Hastings
Attorney, Agent, or Firm—Darby & Darby

[57] ABSTRACT

The invention relates to a process for the preparation of an essentially sulfide-free alkali liquor starting from a pulp mill alkali sulfide source, characterized by reacting in alkaline medium the alkali sulfice source with copper (II) oxide and/or copper (I) oxide, optionally with the addition of water, in a mole ratio oxide to sulfide (calculated as alkali sulfide) (charging) of at least 0.9 and allowing the mixture obtained to react at a temperature of from 30° to 130°0 C. to form hydroxide in an amount equivalent to the amount of sulfide and to precipitate a solid phase consisting essentially of copper (I) sulfide, copper (II) sulfide or a mixture thereof, whereupon the solid phase is separated in a way known per se to obtain an essentially sulfide-free alkali liquor, the reaction time of the precipitation reaction being adjusted with regard to the charging and temperature selected so that the residual concentration of copper ions in the final alkali liquor is below 1 mmole/l.

5 Claims, 2 Drawing Sheets

PROCESS FOR THE PREPARATION OF SULFIDE-FREE ALKALI LIQUOR USING COPPEROXIDE

This is a continuation of application Ser. No. 331,510, filed Mar. 31, 1989, now abandoned which, in turn, is a continuation of application Ser. No. 085,540, filed Aug. 13, 1987, now abandoned.

BACKGROUND OF THE INVENTION

In the pulp and paper industries, increasing amounts of caustic are required. The preparation of pure sodium and potassium hydroxides has traditionally been achieved by electrolysis of the corresponding chlorides. The disadvantage of this process is that the hydroxides can only be prepared simulataneously with equimolar amounts of chlorine. Thus, this presupposes that chlorine as well as liquor can be disposed of at the same time, which is not the case on certain markets. The demand for one of the chemicals also strongly varies with the state of the market and great price fluctuations may occur.

The pulp mills for the preparation of bleached chemical pulp have traditionally been large consumers of chlorine as well as of soda lye in their external bleach plants. Soda lye is further used as sulfur-free make-up chemical. During the fifties and sixties, the consumption of sodium hydroxide and chlorine was about the same in harmony with the production conditions of the chlorine-alkali plants.

In the seventies, oxygen bleaching and chlorine dioxide began to replace chlorine in the bleach plants of the pulp mills, which has meant a decreased use of elementary chlorine, whereas the consumption of sodium hydroxide has increased.

In Sweden a further environmentally conditioned decrease of the use of chlorine for pulp bleaching is to be expected, whereas new methods requiring still more sodium hydroxide (e.g., treatment of the pulp with nitrogen oxides prior to oxygen bleaching) are in the process of development.

The imbalance in chlorine and caustic use in the pulp industry for bleached chemical pulps is thus already a problem in certain markets and may become still greater in the future.

Traditionally sodium sulfate (salt cake, $Na_2SO_4$) is used as make-up chemical for the losses of sodium and sulfur resulting in the pulp manufacture. Alternatively, sodium hydroxide or any other sulfur-free sodium source as well as elementary sulfur or another sulfur-containing chemical can be used.

By way of background, two basic processes are used in the pulp industry: the kraft or sulfate process and teh sulfite process.

The kraft process is clearly described in G. A. Smook, *Handbook for Pulp & Paper Technologists* (Altlanta, GA: TAPPI, 1982), pages 66–67 as follows:

White liquor containing the active cooking chemicals, sodium hydroxide (NaOH) and sodium sulfide ($Na_2S$), is used for cooking the chips. The residual black liquor containing the reaction products of lignin solubilization is concentration and burned in the recovery furnace to yield an inorganic smelt of sodium carbonate ($Na_2CO_3$) and sodium sulfide. The smelt is dissolved to form green liquor, which is reacted with quick lime (CaO) to convert $Na_2CO_3$ into NaOH and regenerate the original white liquor...

Most mills maintain a white liquor cooking sulfidity within the range of 25 to 35% (based on TTA). The critical low level for sulfidity is not well defined; but most investigators agree that below 15%, a deterioration in cooking reaction rate and pulp quality would certainly occur. A higher level is maintained to provide a safety margin and allow greater use of makeup chemicals containing sulfur (usually $Na_2SO_4$).

The sequential steps in the pulping and recovery process: the cooking and washing steps where the chips introduced are converted to pulp; the separation of black liquor containing alkali liquor, hydrolysis salts and sulfonation products; evaporation and burning of the black liquor and the dilution thereof to form a "green liquor" containing $Na_2CO_3$ and $Na_2S$; a causticizing step wherein the green liquor is converted with lime to "white liquor," a mixture of NaOH and $Na_2S$; and finally a recycling of the white liquor to the cooking and washing steps. A more detailed listing of the steps in the process is given in FIG. 7-3 on p. 69 of the *Handbook*.

In the sulfite process, as presently practiced, the paper chips are cooked, i.e., digested, in a mixture of sulfurous acid ($H_2SO_3$) and a soluble base such as sodium sulfite ($Na_2SO_3$). In this process, at the end of the cooking stage, the digester contains solid lignocellulosic material, cooking liquor containing the original inorganic chemicals, dissolved or colloidal lignin fragments, carbohydrate materials and resinous substances. The spent cooking liquor is drained from the pulp and chips, concentrated by evaporation. This concentrate is burned in a reductive furnace to form a product which is smelt consisting predominantly of sodium sulfite ($Na_2S$) and sodium carbonate ($Na_2CO_3$).

This smelt may be solidified by cooling to form flakes or powders, or quenched and dissolved in water to make a solution with a green color (the so-called "green liquor"). The latter processing step is used almost exclusively and provides intermediate for 80% of the pulping liquor manufacture in the world. Most of it goes into making kraft, that is, sulfate liquor which uses the sulfite of the smelt unchanged. The carbonate, however, is converted into caustic soda by a causticizing step with burnt lime. Before causticization, it is not necessary to separate the sulfide from the carbonate.

On the other hand, where a sodium-based sulfide liquor is required from the green liquor, chemical conversion of the sulfide into sulfite is necessary. The carbonate can be used directly to produce the liquor. For the invention of the sulfite into sulfite, the pH of the green liquor is reduced by releasing $H_2S$ gas, which is subsequently reacted to form $SO_2$. The latter is then combined with the carbonate in making the sulfite-pulping liquor.

Today the need for sulfide-free alkali liquor is met chiefly by oxidation of white liquor with oxygen from the air and/or by purchase of extranesous sodium hydroxide. Other alternative processes knwon today for the manufacture of sulfide-free alkali liquor are the so-called Stora process, the Tampella process, the Ebara process, and cooling crystallization. The first three of these processes are described, beginning on pages 284, 288 and 294, respectively, of Ingruber et al., Eds., *Pulp and Paper Manufacture, Third Edition, Vol. 4, Sulfite Science & Technolgoy* (Atlanta, GA: TAPPI, 1985). All of these processes require the consumption of a considerable amount of sodium hydroxide and most require a causticizing step in order to provide the desired hydroxide solution; i.e., the primary product in the processes is a more or less pure sodium carbonate in solid or dissolved form. The causticizing is either effected in a conventional way by the addition of caustic lime (CaO) or by the addition of an amphoteric metal oxide, e.g., $Fe_2O_3$, and then burning and leaching (autocausticizing). In this context, reference is made to U.S. Pat. No. 4,000,264. Both processes comprise several process steps.

The Stora process (cg. K. N. Cederqvist et al., *TAPPI* 43:8 (1960), pp. 702–706) and the Ebara process (cf. A. Teder, *Nordisk Cellulosa* 1:2 (1984), p. 12) are today considered as technically and economically unsuitable for the preparation of sulfide-free alkali liquor from liquors of sulfate pulp processes.

The Tampella process comprises the evaporation of the hydrogen sulfide by neutralization of a sulfide-containing alkali solution with flue gas ($CO_2$). The disadvantage of this method is that the desired end product, i.e., the hydroxide, is first eliminated and then regenerated at a later stage.

In cooling crystallization, the green liquor is cooled down to about 9° C., causing a major part of the sodium carbonate in the green liquor to precipitate as $Na_2CO_3$. $10H_2O$. In addition to the need for causticizing in this process a further disadvantage is the energy losses resulting from the cooling.

The need for bleached chemical pulp, that is, pulp having a maximum whiteness, further increases the demand for sodium hydroxide. Though the word "bleaching" is used imprecisely in the paper industry, it is now recognized to include both delignification and brightening. Delignification takes place not only in the digester but in pulp treating processes following digestion, as well as in what is conventionally referred to as the bleach plant. There are a number of options now available for extending delignification below that normally achieved in digestion. Such "extended delignification" is discussed in the article by D. W. Reeve entitled "The Future of Bleaching" in the June 1985 edition of the *Tappi Journal*. Of the extended delignification discussed by Reeve, modified cooking, oxygen delignification, nitrogen dioxide delignification, and hydrogen peroxide delignification all require the use of sodium hydroxide. In modified kraft pulping, alkali is added at several points during the cook to keep the initial concentration low and raise the concentration near the end of the cook. This technique improves the selectivity and minimizes the damage done to the cellulose; such delignification is frequently referred to as nitrogen oxide and peroxide bleaching. The effect of pretreatment with nitrogen dioxide/oxygen (NOX) is also discussed by Abrahamsson et al. in *Svensk Papperstidning*, No. 3-1982 85 (1982), pages R27-R32. Table 1 of this article also shows the need for sodium hydroxide in the pretreatment steps.

Bleaching post-cooking is generally carried out in a stepwise sequence utilizing different chemicals and conditions in each stage, with washing carried out between stages. This subject is generally discussed in the *Handbook*, pages 153–172. As noted on page 154 of this article, the following designations are commonly used to describe these chemical treatments:

| | |
|---|---|
| Chlorination (C) | Reaction with elemental chlorine in acidic medium. |
| Alkaline Extraction (E) | Dissolution of reaction products with NaOH. |
| Hypochlorite (H) | Reaction with hypochlorite in alkaline solution. |
| Chlorine Dioxide (D) | Reaction with $ClO_2$ in acidic medium. |
| Peroxide (P) | Reaction with peroxides in alkaline medium. |
| Oxygen (O) | Reaction with elemental oxygen at high pressure in alkaline medium. |
| $(D_c)$ or $(C_D)$ | Admixture of chlorine and chlorine dioxide. |

This article notes that conventionally chlorine and sodium hydroxide were prepared by the electrolysis of brine; however, as chlorine bleaching became less and less desirable, this process became an inefficient means of generating sodium hydroxide because of the imbalance caused by the excess of chlorine produced. To aggravate the situation, the frequent replacement for chlorine is chlorine dioxide; this latter chemical is conventionally made from sodium chlorate by reduction with such reducing agents as chloride ion or sulfur dioxide in 9N sulfuric acid. Again, to form the sodium chlorate, sodium hydroxide is required. Because of the unstable nature of sodium dioxide, it is desirable that this bleach be made at the site of the pulp and paper plant. The by-products of this reaction include sodium sulfate and sulfuric acid. This residual waste acid is conventionally recycled to the recovery system and supply make up sodium and sulfur.

As recognized above, between each bleaching stage there is an extraction stage. These stages, which remove chlorinated and oxygenated lignin from the system, also require caustic because they must be performed at a high pH, one above 10.8, to achieve complete solubilization.

With regard to oxygen bleaching, again, sodium hydroxide is required. Generally from 3 to 7%, based on weight of pulp, is used to neutralize organic acid reaction products and maintain high alkaline conditions. Other forms of oxygen bleaching, such as those employing peroxide, are in need of caustic soda. The conventional peroxide bleaching includes the addition of hydrogen peroxide, magnesium sulfate, sodium silicate and caustic soda. For the best results, the pH must be adjusted and buffered to about 10.5. Basically, this is done by the addition of the sodium hydroxide and sodium silicate. Accordingly, it will be noted that the evolution of both the kraft and sulfite pulp processes has resulted in the need of more and more sodium hydroxide.

In the pulp mill, the sulfur is present as sulfide after the chemical recovery unit. During recent years, the discharge of sulfur ($SO_2$ to the air and sulfate to the water) and sodium and potassim to the water have decreased considerably, owing to more severe environmental restrictions. This especially applies to Scandinavia but is expected to be applicable to large parts of the rest of the world within the near future. These environmental demands have resulted in the introduction of so-called oxygen bleaching requiring the use of sulfide-free alkali liquor. In order to be able to use, e.g., white liquor as an internal sulfide-free alkali liquor for oxygen bleaching and also for gas washing, the sulfide content has to be eliminated.

DESCRIPTION OF THE INVENTION

Figure 1:
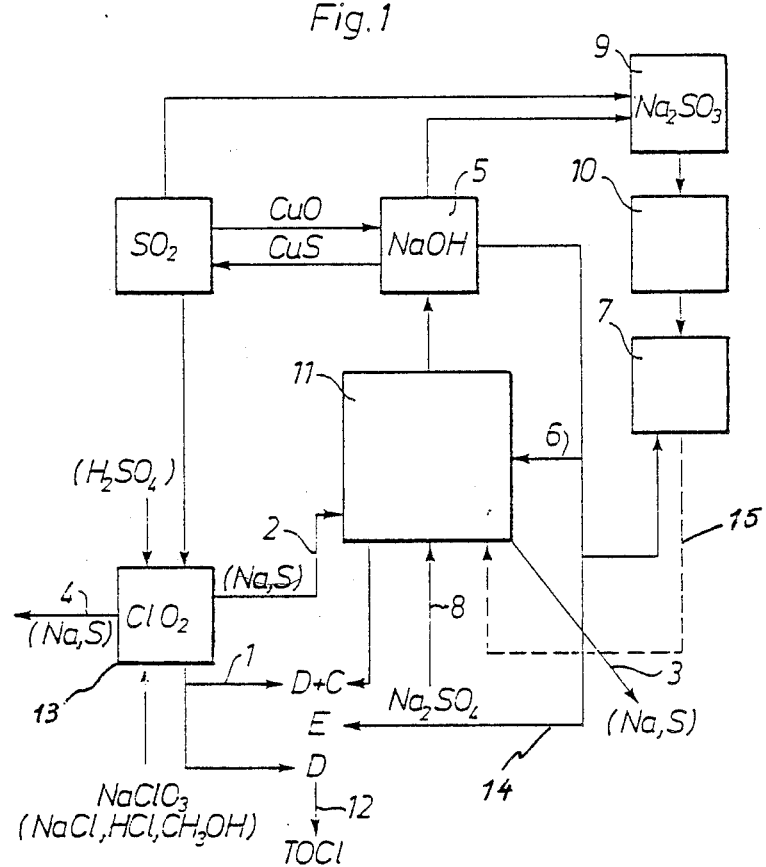
FIG. 1 is a flow chart of a pulp mill used for the preparation of bleached chemical pulp in accordance with the teachings of the invention.

The present invention relates to a process for the preparation of an essentially sulfide-free alkali liquor starting from an alkali sulfide source, the process being characterized by reacting in alkaline medium the alkali sulfide source with copper (II) oxide and/or copper (I) oxide, optionally with the addition of water, in a mole ratio, oxide to sulfide (calculated as alkali sulfide), of at least 0.9 and allowing the mixture obtained to react at a temperature of from 30° C. to 130° C. to produce hydroxide in an amount equivalent to the sulfide amount and to precipitate a solid phase which essentially consists of copper (I) sulfide, copper (II) sulfide or a mixture thereof. The solid phase is separated in a way known per se to obtain an essentially sulfide-free alkali liquor. The reaction time of the precipitation is adjusted with regard to the charge and temperature selected so that the residual concentration of the copper ions in the final alkali liquor is below 1 mmole/l.

The expression "sulfide" shall in this context, if not otherwise stated, be interpreted in its broadest sense and comprises $HS^-$, $S^=$, polysulfide ($S_n^=$), as well as $H_2S$. By "alkali liquor" in this context is meant an aqueous solution of alkali hydroxide, particularly sodium hydroxide and potassium hydroxide. Where the sulfur-containing compounds are in the form of sulfate, for use in the process of the invention, they must be reduced to the sulfide state.

According to U.S. Pat. No. 2,054,727, it is known to prepare alkali liquor by treatment of alkali sulfide wiht zinc oxide to form zinc sulfide. However, the use of zinc oxide has many disadvantages, which makes the commercial application of the process difficult. We have found that the use of copper oxide unexpectedly and surprisingly eliminates said disadvantages and in this context we refer to the enclosed Comparative Examples. The unexpected advantages of copper oxide include the following:

(a) When filtering and roasting the metal sulfide, it is desired the particle size be as large as possible. Whereas precipitation with zinc oxide provides a submicronic average particle size, it has been found that the copper sulfide under the corresponding conditions has a considerably larger average particle size (cf. Comparative Example 1).

(b) In industrial processes, it is of importance that the reaction times be as short as possible. The precipitation of copper sulfide at normal white liquor conditions has been shown to proceed faster than the precipitation of zinc sulfide (cf. Comparative Example 2).

(c) The precipitation of copper sulfide is not as temperature-sensitive as the precipitation of zinc sulfide (cf. Comparative Example 3).

(d) Polysulfides in alkaline solutions can be eliminated with copper oxide but not with zinc oxide.

(e) Precipitation with copper oxide provides a practically controllable process. Undercharging of CuO results in an orange solution, while too large a charge results in a blue solution. In the precipitation of ZnS, the reaction solution does not change its color, neither at undercharging nor at overcharging.

(f) Copper oxide has a lower solubility than zinc oxide at high hydroxide ion contents (cf. Comparative Example 4).

(g) It is sometimes of importance to be able to eliminate the effects of the undesirable content of metal ions with complexing agents. It has been found that the most common complexing agent, e.g., DTPA (diethylene triamine pentaacetic acid) has a considerably greater affinity for the copper ion than for the zinc ion.

Further, it shall be noted that U.S. Pat. No. 2,054,727 on page 2, the paragraph bridging the left and right columns, states as an advantage that one can use an excess of only 25%. Such a large excess of copper oxide would strongly restrict the practical applicability of the process according to the present invention.

From No. 101,658 and DE-OS No. 25 33 794 it is known that the sulfide in the liquor from cooking of cellulose can be separated by precipitation as iron sulfide. According to the patents either iron oxide or iron hydroxide is added for this purpose.

In the preparation of the sulfide-free alkali liquor according to the invention, the problem of the production of by-products arises: in the present case, copper sulfide. Since it is desirable to be able to reuse the copper sulfide in the process according to the invention, said copper sulfide must be converted to copper oxide, which oxide, which can be effected in different ways. The sulfur content of the copper sulfate can then be removed by a known process as hydrogen sulfide, sulfur dioxide or elementary sulfur (Claus-process). It is, of course, desirable that the sulfur component be disposed of in a way that satisfies both the economy and the ecology. A preferred method is to treat the copper sulfide by roasting, the sulfide sulfur being converted to sulfur dioxide which either can be used directly or be further processed to form sulfuric acid, a great international bulk chemical. Particularly suitable industry applications are those that can use the sulfide-free alkali liquor as well as the sulfur component, e.g., the manufacture of bleached chemical kraft pulp.

We have studied in detail the oxide products obtained when roating different metal sulfides and have then surprisingly found that only copper has been shown to possess all properties making possible a practical use of the invention. Iron sulfide that has been roasted in present as $Fe_2O_3$. The degree of conversion of $Fe_2O_3$ to sulfide has, when tested by means of the process according to the invention, been shown to be very low, contrary to what is stated in the two patents.

Further, from No. 107,996 it is known that polysulfide can be prepared by the addition of copper (II) oxide to a sulfide-containing alkaline solution. In the patent, a mole ratio $CuO/Na_2S$ of about 0.78 is recommended.

According to the invention, one can thus prepare an essentially sulfide-free alkali liquor. By "essentially sulfide-free" in this context is meant that the alkali liquor obtained contains less than 0.02 moles/l of hydrogen sulfide ions. As has already been mentioned above, "alkali liquor" means an aqueous solution of alkali hydroxide, preferably sodium hydroxide, the sodium hydroxide concentration being at least 1% by weight, e.g., 10–15 and up to 50% by weight. By "alkaline medium" is meant a hydroxyl ion concentration of preferably at least 0.2 moles per liter.

By "alkali sulfide source" is meant alkali sulfide in aqueous solution (e.g., a sulfide-containing liquor) or in solid phase or as a melt. As an alkali sulfide source one can thus use, in the process according to the invention, sodium sulfide-containing liquors, e.g., from the pulp industry, especially from sulfate processes and principal white liquor and green liquor which contain substantial amounts of caustic. However, the process according to the invention is not restricted to the pulp industry but is generally applicable to alkali sulfide-containing liquors from industry. The expression "alkali sulfide containing liquor" shall also be interpreted generally so that said expression also comprises alkali sulfide dissolved in its own crystal water.

FIG. 1 shows the advantage of the invention in a pulp mill for the preparation of bleached chemical pulp. A simple way is provided to avoid the dependency of the sodium and sulfur balance at the prevailing sulfidity. In the pulp mill illustrated, chlorine dioxide is fed via line 1 to the first bleaching step. If a high proportion is required, the amount of sodium and sulfur as residual products exiting via line 2 from the chlorine dioxide generator 13 far exceeds that needed to cover the losses leaving the mill via line 3. This often means that a great deal of so-called residual acid has to be discharged from the chlorine dioxide generator 13 to sewage disposal system via line 4. This is an economical loss and at the same time negative from an environmental point of view. In the subject invention, all residual products from the chlorine dioxide generation can be introduced into the chemical recovery system 11. The excess of sulfur then added can be withdrawn via the white liquor tank 5. The alkali liquor then obtained can be used internally, entering the kraft recovery system 11 via line 6, fed to the extractioin step of the bleaching stage via line 14 and/or disposed of externally via line 7, dependent on the circumstances.

In order to increase the amounts of sulfur dioxide and sulfide-free alkali liquor according to the invention, extra salt cake may be added via line 8. This procedure can also be utilized to make sodium sulfite in unit 9 for use in CTMP or other sulfite-consuming processes as represented by unit 10. Optionally, waste liquors containing sulfur and sodium can be returned to the kraft recovery system 11 via line 15.

It will be understood that the chemical recovery system 11 in FIG. 1 includes a multitude of conventional steps, as set forth above. The caustic entering the recovery system via line 6 may be used in the extended delignification, the NOX-delignification and the oxygen delignification, as well as in the green liquor exiting the recovery boiler. The sequence of steps in the recovery system is described above.

Generally speaking, the by-products from the chlorine dioxide generator 13 fed to the recovery system are sodium sulfate and sulfuric acid.

White liquor having a sulfidity of 40% has a ratio $OH^-/HS^-$ of 4:1. For the preparation of oxidized white liquor, the following equation applies.

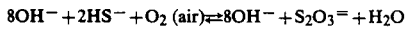

In this condition, the liquor is excellent for use in gas washing purposes. However, if it is used in oxygen bleaching (HC), it has been shown that it is oxidized in varying degrees according to the following equation:

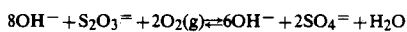

This is to be compared with the claimed invention

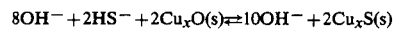

where $x=1$ or $x=2$.

Thus, it is evident that the alkali liquor according to the invention increases the hydroxide concentration by an amount corresponding to the $HS^-$ content despite the already prevailing high alkalinity in contrast to the oxidized white liquor where the alkalinity of the $HS^-$ content is destroyed. This means that the invention has a further advantage, namely, a lower ion strength in the oxygen bleaching plant owing to the absence of increased ballast in the form of thiosulfate and sulfate. Minor amounts of water are added, which leads to lower evaporation costs. In principle, by a combination of chlorine dioxide process and bleaching sequence, the process can be quite self-supporting as regards bleaching chemicals, including external alkali liquor prepared according to the invention.

Further, the sulfur as well as the copper in the copper sulfide may be reused upon roasting or according to other known technique.

High proportions of chlorine dioxide in the first bleaching step is one way to reduce the discharges of chlorinated organic substance from the bleaching plants (TOCl) (12), which is highly valued from an environmental protection point of view.

As regards oxygen-bleached pulps, the use of alkali liquor prepared according to the invention, even with a further addition of copper salts, has not shown any negative effects on the pulp quality.

The mole ratio between the copper oxide added and the sulfide shall be at least 0.9. Preferably, use is made of a mole ratio of from 0.9 to 1.5, and especially from 0.9 to 1.2, and particularly from 1.00 to 1.10. In certain cases, it can be preferred to use overcharging, since this results in a faster precipitation process.

The precipitation temperature is within the range from 30° to 130° C., a preferred range being from 60° to 110° C. The precipitation is particularly effected at a temperature of from 80° to 100° C., and particularly at about 90° C.

The precipitation time selected is not especially critical but is adjusted dependent on the temperature and charging conditions used. A lower temperature and undercharging require a longer reaction time whereas, on the other hand, a higher temperature and overcharging require a shorter reaction time.

Normally the precipitation is completed within from about 10 to 40 minutes, typically already after 15 minutes. For instance, one can reach a 100% precipitation at 90° C. when using copper oxide at a charging somewhat above the stoichiometric ratio, i.e., just about 1.00.

The reaction pressure is not critical but the precipitation reaction can be effected at atmospheric pressure or at a pressure below or above atmospheric pressure.

The solid phase obtained in the precipitation consists essentially of copper sulfides and this phase is separated in a way known per se. This can be done by sedimentation, decantation, centrifugation, filtration, filter pressing, etc.

The copper oxide used in the process according to the invention can, if desired, be reformed by roasting of the copper sulfide in a way known per se in an excess of air. Said roasting is usually carried out in fluidized bed, rotary oven, or by flash roasting. The sulfur dioxide formed simultaneously with the copper oxide in the roasting can be used for chlorine dioxide generation and for the preparation of sulfide cooking liquors. Other fields of use are chemicals for sulfite cooking liquors, CTMP-preparation, and of course for making sulfuric acid.

The sulfide precipitate obtained in the process according to the invention can upon separation from the mother liquor be washed with water to achieve a reduction of the alkali losses and obtain a purer precipitation for the subsequent roasting, if any, or other treatment. If the amount of washing water is kept within reasonable limits, it can be recirculated to the sulfide-containing liquor used as starting material without this liquor becoming too weak.

In the process according to the invention, the reaction conditions shall be adjusted so that the residual concentration of copper ions in the final alkali liquor is below 1 mmol/l, preferably 0.1 mmol/l since such a content is normally not detrimental to the pulping processes.

Figure 2:
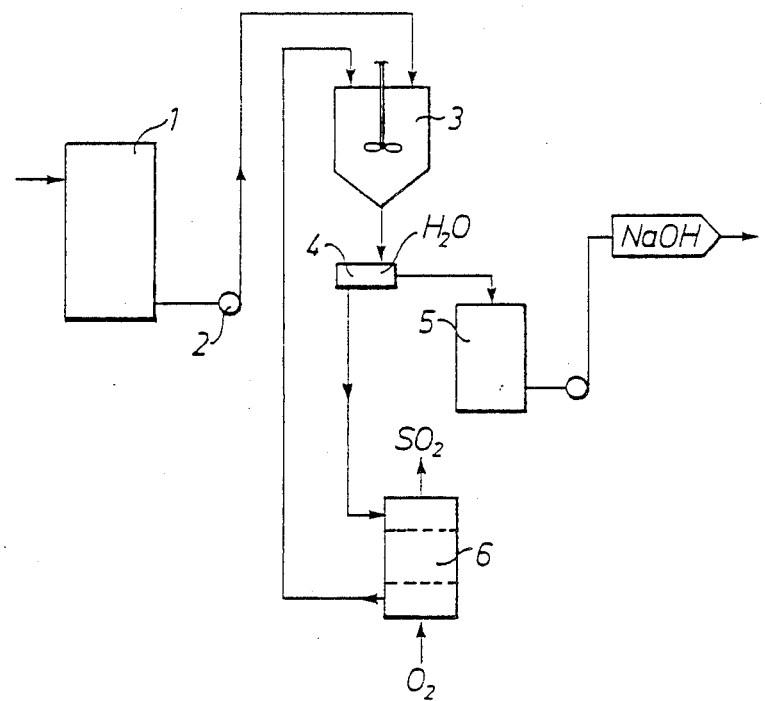
FIG. 2 is a flow chart illustrating the treatment of the alkali sulfide source from the pulp mill with copper oxide to form caustic in accordance with the instant invention.

The process of the invention is now further elucidated with reference to FIG. 2 of the enclosed drawings, which is a flow chart of an embodiment of the process of the invention for the preparation of a sulfide-free soda lye starting from a white liquor stored in the buffer tank 1. Via a pump 2 the white liquor is passed to the reaction tank/precipitation tank 3, on which also copper oxide from a roasting oven 6 is introduced. The precipitation process proceeds in the reaction tank/precipitation tank 3 with stirring and, after the calculated reaction time, the slurry tank 3 is fed to the separation unit 4, which can be a centrifuge, a filter or the like.

The precipitate separated can be washed with water, if desired. The mother liquor obtained in the centrifugation or filtration is passed to the tank 5, whereas the precipitate obtained in the separation unit 4, chiefly consisting of copper sulfide, is passed to the roasting oven 6 where the sulfide precipitate is roasted in an excess of air to form the oxide with the simultaneous formation of sulfur dioxide. Finally, the sulfide-free sodium hydroxide solution obtained is passed to a storage tank.

The invention is further elucidated by the following Examples:

EXAMPLE 1

Preparation of sulfide-free alkali liquor from white liquor using different charges of CuO To a white liquor of the following composition $[Na^+]=4.5$ moles/l, $[OH^-]=3.3$ moles/l, $[HS^-]=0.6$ moles/l and $[CO_3^=]=0.3$ moles/l, copper (II) oxide was added in an amount corresponding to the mole ratios $CuO/Na_2S$ stated in Table I. The temperature of the white liquor was 90° C. At the prevailing reaction conditions, the white liquor after a reaction time of about 1 hour contained the contents of sulfide and hydroxide stated in Table I in the solution upon separation of precipitated copper sulfide (by filtration in a glass filter G 4). The $HS^-$ and $OH^-$ contents in the solution were analyzed according to SCAN-N 2:63, Svensk Papperstidning 66 (1963) 18, 727.

TABLE I

| Charge $CuO/Na_2S$ | CuO added g/l | $[HS^-]$ moles/l | $[OH^-]$ moles/l |
|---|---|---|---|
| 0.8 | 38 | 0.15 | 3.8 |
| 0.9 | 43 | 0.1 | 3.8 |
| 1.0 | 48 | 0.02 | 3.9 |
| 1.1 | 52 | <0.01 | 3.9 |
| 1.3 | 62 | <0.01 | 3.9 |

EXAMPLE 2

Preparation of sulfide-free alkali liquor starting from green liquor by the addition of CuO To a green liquor of the following composition: $[Na^+]=4.0$ moles/l, $[OH^-]=1.2$ moles/l, $[HS^-]=0.6$ moles/l and $[CO_3^=]=1.1$ moles/l, there were added 48 g/l CuO (mole ratio $CuO/Na_2S=1.0$). At the same test conditions as in Example 1, less than 0.02 moles/l $HS^-$ (analyzed as in Example 1) remained in solution after a reaction time of about 1 hour and after separation of precipitated copper sulfide (in the same way as in Example 1).

EXAMPLE 3

Preparation of sulfide-free alkali liquor starting from white liquor at different temperatures and a charge ratio of $CuO/Na_2S$ of 1.1

To a white liquor of the same composition as in Example 1, there were added at different temperatures 52 g/l CuO (mole ratio $CuO/Na_2S=1.1$). At the same test conditions as in Example 1, after a reaction time of about 1 hour, the precipitated copper sulfide was separated (in the same way as in Example 1) and contained $HS^-$, $OH^-$ and Cu (I, II) concentrations stated in Table II in solution. The $HS^-$ and $OH^-$ were analyzed as in Example 1 and the Cu (I, II) by atomic absorption spectrometry.

TABLE II

| Temperature, degrees C. | Time, hours | $[HS^-]$, moles/l | $[OH^-]$, moles/l | [CU (I, II)] mg/l total |
|---|---|---|---|---|
| 30 | 1 | 0.02 | 3.9 | 6.0 |
|  | 3 | <0.01 | 3.9 | 2.2 |
| 60 | 1 | <0.01 | 3.9 | 0.8 |
| 90 | 1 | <0.01 | 3.9 | 1.6 |

EXAMPLE 4

Preparation of sulfide-free alkali liquor starting from white liquor by the addition of $Cu_2O$ To a white liquor of the same composition as in Example 1 (0.6 mole/l $HS^-$), the amount of $Cu_2O$ stated below in Table III was added at 90° C. At the prevailing test conditions, the white liquor after a reaction time of about 15 minutes and after separation of precipitated copper sulfide (in the same way as in Example 1) contained the contents of $HS^-$, $OH^-$ and Cu (I, II) stated in Table III in solution (analyzed as in Example 3).

TABLE III

| $Cu_2O/Na_2S$ Charge | $Cu_2O$ g/l | $[HS^-]$, moles/l | $[OH^-]$, moles/l | [CU (I, II)] mg/l total |
|---|---|---|---|---|
| 1.00 | 86 | <0.01 | 3.9 | 2 |

EXAMPLE 5

Preparation of sulfide-free alkali liquor from Na$_2$S.nH$_2$O

Finely divided Na$_2$S.nH$_2$O was mixed with CuO in amounts corresponding to a mole ratio CuO/Na$_2$S of 1.05 and at the temperatures stated in Table IV. In one case, additional water was added. After a reaction time of about 3 hours and separation of solid phase (filtration in sintered glass filter, G4), the solution contained the HS$^-$ and OH$^-$ contents stated in Table IV. The analysis was according to Example 3.

TABLE IV

| Reaction temp., °C. | n | Na$_2$S.nH$_2$O g/l | CuO g/l | Water ml | [OH$^-$] moles/l | [Cu (I,II)] mg/l total |
|---|---|---|---|---|---|---|
| 80 | 9.2 | 38 | 13 | 10 | 9.0 | 2 |
| 50 | 5.1 | 59 | 29 | 0 | 16.3 | 16 |

Below follow four Comparative Examples showing the unexpected and surprising properties of using CuO compared to using ZnO.

COMPARATIVE EXAMPLE 1

Particle sizes of the precipitated metal sulfide

To white liquor copper oxide and zinc oxide, respectively, were added in a mole ratio metal oxide/Na$_2$S of 1.05. The temperature of the white liquor was 90° C. Reaction time was 5–300 minutes. The particle size of the metal sulfide precipitated was as follows:

| Metal sulfide | Average particle size, um |
|---|---|
| CuS | 45 |
| ZnS | <1 |

The larger particle size of the CuS greatly improves the possibility to separate the precipitate, e.g., by filtration.

COMPARATIVE EXAMPLE 2

Rate of precipitation

The reaction conditions were the same as in Comparative Example 1, but the charging (mole ratio) was 1.1. The following results were obtained:

| Metal sulfide | Precipitated amount of sulfide % | Reaction time, minutes |
|---|---|---|
| CuS | 98 | 5 |
| ZnS | 95 | 30 |

The faster reaction of CuO means a smaller reaction vessel.

COMPARATIVE EXAMPLE 3

Temperature dependency

White liquor was used and the charge ratio was 1.1. The reaction rate when precipitating CuS(s) at 30° C. is of about the same size of magnitude as for precipitating ZnS(s) at 90° C. The precipitation of CuS(s) is not quite as temperature dependent as the precipitation of ZnS(s), i.e.; an unintentional cooling of the reaction solution makes a minor difference.

COMPARATIVE EXAMPLE 4

Solubility at high hydroxide ion contents

Owing to the low solubility of copper oxide in alkaline solutions (as hydroxide complex), sulfide-free liquors of very high content of sodium hydroxide can be prepared without the metal content of the solution increasing appreciably. The following results were obtained at the following reaction conditions: temperature 90° C., charging 1.05; reaction time 120 minutes; filtration on G4-filter.

| Metal oxide | Alkali content, % W of NaOH | Me$^{2+}$ total, g/l |
|---|---|---|
| CuO | 30 | 0.6 |
| ZnO | 30 | 110 |

What is claimed is:

1. In a process for the manufacture of bleached sulfate pulp employing a chemical recovery system comprising cooking, black liquor concentration, reductive burning of black liquor in a recovery boiler, preparation of green liquor from the inorganic smelt from the recovery boiler, causticization of green liquor to form white liquor solution containing alkali sulfide and alkali hydroxide and further incorporating the following steps: oxygen delignification and extraction stages for chlorine, chlorine dioxide or hydrogen peroxide bleaching and, optionally, either or both of the steps of extended delignification and scrubbing of sulfur dioxide, the improvement comprising:

reacting the alkali sulfide in the white liquor solution with copper oxide at a temperature from 60° to 110° C., the molar ratio of oxygen in said copper oxide per mole of sulfur being from 0.9:1 to 1.2:1;

precipitating copper sulfide from said white liquor solution so as to form a colorless solution having an increased alkali hydroxide content which is substantially free of polysulfides and has a copper ion content of less than 1 mmol/l;

separating the aforesaid copper sulfide precipitate from the alkali hydroxide solution;

recycling the alkali hydroxide solution directly to the incorporated further steps; and reprocessing the precipitated copper sulfide to form copper oxide for recycle to the precipitation step.

2. The process of claim 1 wherein the precipitated copper sulfide is roasted in the presence of oxygen to form copper oxide and sulfur dioxide, wherein the sulfur dioxide is reacted with a portion of said alkali hydroxide so as to form alkali sulfite which is recycled to the pulp manufacturing process and the copper oxide is recycled for further reaction with the alkali sulfide.

3. The process of claim 1 wherein sulfur compounds are recovered from said copper sulfide and at least a portion of said recovered sulfur compounds are, directly or indirectly, used for the preparation of chlorine dioxide or sodium sulfite.

4. In a process for the preparation of sodium sulfite pulp employing a chemical recovery system comprising a cooking stage, cooking liquor concentration, reductive burning of the concentrated cooking liquor in a recovery boiler, formation of a green liquor containing alkali sulfide and alkali hydroxide by the dissolution of the inorganic smelt from the recovery boiler and the conversion of the green liquor into sodium sulfite, the improvement comprising: treating the green liquor with copper oxide at a temperature from 60° to 110° C., the molar ratio of oxygen in said copper oxide per mole of sulfur being from 0.9:1 to 1.2:1, so as to precipitate copper sulfide and form a colorless solution having an increased alkali hydroxide content which is substantially free of polysulfides and has a copper ion concentration of less than 1 mmole/l; separating the aforesaid copper sulfide precipitated from the alkali hydroxide solution; reprocessing the precipitated copper sulfide to form copper oxide and sulfur dioxide; recycling the copper oxide to the precipitation step; reacting the alkali hydroxide solution and the sulfur dioxide to form sodium sulfite; and recycling the sodium sulfite to the cooking stage.

5. The process of claim 4 wherein sulfur compounds are recovered from said copper sulfide and at least a portion of said recovered sulfur compounds are, directly or indirectly, used for the preparation of chlorine dioxide or sodium sulfite.

* * * * *